United States Patent [19]

Takahata et al.

[11] Patent Number: 5,326,628
[45] Date of Patent: Jul. 5, 1994

[54] FRICTIONAL MATERIAL COMPRISING BI-COMPONENT YARN TWISTED WITH A METAL WIRE

[75] Inventors: Sirou Takahata; Jirou Amakawa; Masami Tsuji, all of Nara, Japan

[73] Assignee: Nichias Corporation, Tokyo, Japan

[21] Appl. No.: 871,305

[22] Filed: Apr. 20, 1992

[30] Foreign Application Priority Data

Apr. 26, 1991 [JP] Japan .................. 3-122809

[51] Int. Cl.$^5$ ........................... D03D 13/00
[52] U.S. Cl. .................. 428/222; 428/260; 428/273; 428/377; 57/224; 57/229; 57/231; 57/232; 57/235
[58] Field of Search ........ 428/222, 272, 273, 377; 57/224, 229, 232, 231, 235

[56] References Cited

U.S. PATENT DOCUMENTS

| | | | |
|---|---|---|---|
| 4,015,038 | 3/1977 | Romanski et al. | 428/255 |
| 4,244,994 | 1/1981 | Trainor et al. | 428/37 |
| 4,539,240 | 9/1985 | Wargin | 428/64 |
| 4,670,327 | 6/1987 | Weber | 428/257 |
| 4,921,756 | 5/1990 | Tolbert et al. | 428/373 |
| 4,927,698 | 5/1990 | Jaco et al. | 428/198 |

FOREIGN PATENT DOCUMENTS

| | | |
|---|---|---|
| 0451320 | 10/1991 | European Pat. Off. . |
| 2096654 | 10/1982 | United Kingdom . |
| 2125451 | 3/1984 | United Kingdom . |
| 2129006 | 5/1984 | United Kingdom . |

Primary Examiner—George F. Lesmes
Assistant Examiner—Chris Raimund
Attorney, Agent, or Firm—Flynn, Thiel, Boutell & Tanis

[57] ABSTRACT

A frictional material is made of cloth which is impregnated with a bituminous material and/or a synthetic resin. The cloth is woven from a yarn made by twisting single yarns with reinforcing metal wires. The single yarn consists of a center core in the form of a roving or a yarn of inorganic fibers such as glass fiber, rock wool or ceramic fiber and a covering element in the form of a sliver of organic fibers such as staple fiber, aromatic polyamide fiber or flame-resistant fiber. The frictional material obtained is excellent in physical strength and in resistance against heat, effective for preventing dispersion of dust and irritation to human bodies, and advantageous from the viewpoint of cost.

4 Claims, 3 Drawing Sheets

FIG. 5
FIG. 6
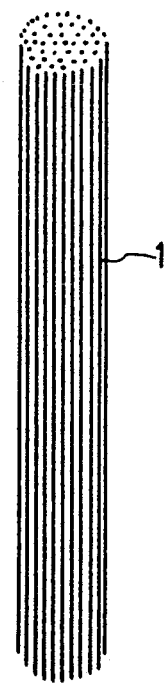
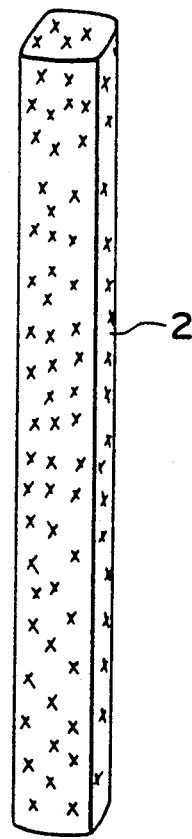

FRICTIONAL MATERIAL COMPRISING BI-COMPONENT YARN TWISTED WITH A METAL WIRE

BACKGROUND OF THE INVENTION

1. Field of the Invention

This invention relates to an improvement of a woven type frictional material to be used as a winch of a marine machine or a construction machine, a brake lining or a disk pad of an automobile, and so on.

2. Description of the Prior Art

One of existing woven type frictional materials (using cloth as its basic element) is made by preparing cloth which is woven with one or a mixture of asbestos fiber, aramid fiber, glass fiber, rock wool, ceramic fiber, staple fiber, or the like, and by impregnating the cloth with a bituminous material or a synthetic resin such as asphalt, gilsonite, tung oil, etc.

The existing frictional material indicated above, however, involves the following problems because of a fiber or fibers used as the basic element of the cloth:

(1) Among the fibers indicated above, the asbestos fiber was considered to be an optimum frictional material because of its excellent resistance against heat and friction. However, the use thereof has been restricted because it adversely affects human bodies.

(2) The rock wool and the ceramic fiber are physically weak and, during handling, produce much dust which irritates human skin.

(3) The glass fiber is physically strong, but produces dust during handling, like the rock wool and the ceramic fiber.

(4) The staple fiber is not resistant against heat.

Since each of the fibers used as basic elements of existing frictional materials has advantages and disadvantages from different viewpoints, as indicated above, an improvement thereof is strongly desired.

OBJECT OF THE INVENTION

It is therefore an object of the invention to provide an improved frictional material which does not produce dust during handling and remarkably increases the physical strength without reducing the resistance against heat.

SUMMARY OF THE INVENTION

According to an aspect of the invention, there is provided a frictional material comprising cloth which is impregnated with an impregnating agent, said cloth being woven by a single yarn which is made of a center core in the form of a roving or a yarn of inorganic fibers and a covering element in the form of a sliver of organic fibers.

Since the center core of the frictional material is a roving or a yarn of inorganic fibers, it compensates relatively less heat-resistant and physical strength of the sliver of organic fibers which covers the center core. The sliver of organic fibers prevents irritation to human skin by the roving or yarn of organic fibers. The impregnating agent increases the heat-resistant and physical strength and prevents dispersion of dust.

BRIEF DESCRIPTION OF THE DRAWINGS

FIG. 5 is a perspective view of a center core in the form of a roving or yarn.

FIG. 6 is a perspective view of a sliver covering element.

DETAILED DESCRIPTION OF THE PREFERRED EMBODIMENT

An embodiment of the invention is explained below with reference to FIGS. 1 to 6.

In these drawings, A designates a single yarn which forms cloth of a frictional material, 1 denotes a center core in the form of a roving or a yarn of organic fibers, which forms the single yarn, and 2 indicates a covering element in the form of a sliver of organic fibers.

The term "roving" means an element made by converging numerous continuous fibers having microscopic diameters (unit of $\mu$). The term "sliver" means a felt-like yarn obtained by combing a mass of disorderly oriented short fibers through a carding or a combing machine.

An optimum organic fiber to be used as the center core is a glass fiber which has both a heat resistance and a physical strength. The glass fiber is preferably 100 to 300 TEX thick. Other fibers such as rock wool and ceramic fiber may also be used if they are continuous fibers. However, since they are short fibers which are difficult to shape into a roving, it is recommendable to mix them with staple fibers and slightly twist them into a yarn.

Representative organic fibers to be used as the covering element 2 are, for example, staple fibers, aromatic polyamide fibers (commercially available under the name of "Kevlar"), flame-resistant fibers (commercially available under the name of "kainor" which is a carbon fiber made from a polyacrylonitrile fiber and having a low degree of carbonization).

The staple fiber is less heat-resistant. However, it is economic, and can be easily shaped into a sliver. In contrast, aromatic polyamide and flame-resistant fibers are short fibers, and cause a less physical strength of a sliver made thereof. However, they are excellent in resistance against heat and in sliding property. They are more expensive than the staple fiber.

In view of the foregoing analysis, it is advantageous and most preferable to use a cotton-mixed sliver made by using staple fibers as a major element and adding one or both of aromatic polyamide fibers and flame-resistant fibers.

The mixture ratio of aromatic fibers and/or flame-resistant fibers with respect to staple fibers is preferably 20% or less. If it is more than 20%, the cost becomes high. The sliver is preferably 150to 300 TEX thick.

Figure 3:
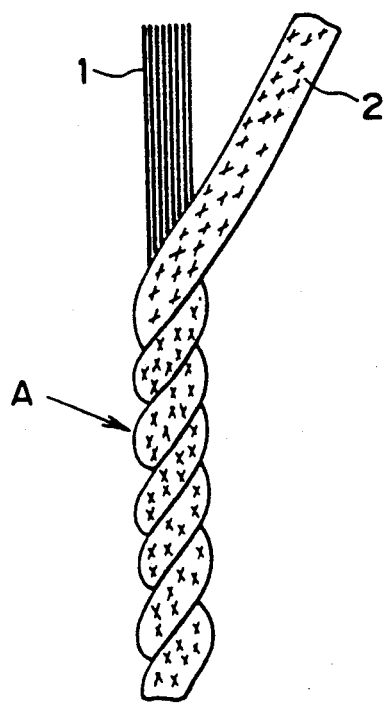
FIG. 3 is a side elevation of a single yarn which forms the multiple yarn.
Figure 4:
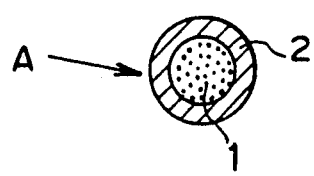
FIG. 4 is a cross-sectional view of the single yarn.

FIG. 3 shows a procedure in which the single yarn A is made by winding the covering element 2 of organic fibers on the center core 1 in the form of the roving of inorganic fibers. The ratio of the center core 1 and the covering element 2 in the single yarn A is preferably such that the center core occupies 35 to 70% of the entirety. If it is less than 35%, the resistance against heat is reduced, and the cost increases. If it is more than 70%, the covering ratio decreases. The covering ratio of the center core by the covering element is preferably 100% in order to prevent dispersion of dust from the center core. However, it is difficult practically, and the order of 80% will be maximal.

Figure 1:
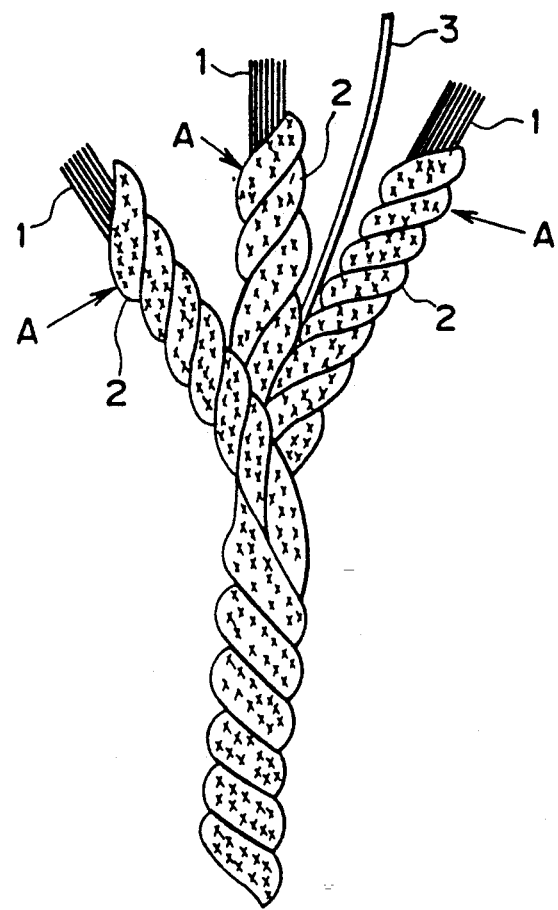
FIG. 1 is a side elevation of a multiple yarn of cloth for a frictional material embodying the invention.
Figure 2:
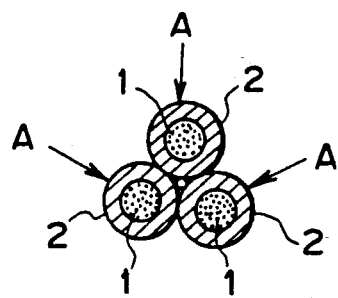
FIG. 2 is a cross-sectional view of the multiple yarn.

FIG. 1 shows a procedure in which a multiple yarn is made by twisting the single yarns A with a metal wire 3. The metal wire 3 is used to increase the strength. By weaving the multiple yarn, cloth is obtained, which is excellent in physical strength and in resistance against heat and prevents irritation to human bodies. By impregnating the cloth with one or both of a bituminous material or a synthetic resin, a frictional material is obtained, which is more excellent in physical strength and in resistance against heat and prevents dispersion of dust. In particular, when the covering element 2 includes staple fibers as its major material, adhesion of the impregnating agent is improved, which leads to more perfect prevention of dispersion of dust.

As described above, the invention provides a frictional material which is excellent both in physical strength and in resistance against heat, effective for preventing dispersion of dust and irritation to human bodies, and remarkably advantageous from the viewpoint of cost.

What is claimed is:

1. In a frictional material which includes a cloth impregnated with an impregnating agent, said cloth including a plurality of yarns of a single type each having a center core in the form of a roving or a yarn of inorganic fiber and a covering element in the form of a sliver of an organic fiber, said covering element being wound around said center core so as to substantially cover said center cord, said center core being made of one or more of a glass fiber, rock wool and a ceramic fiber, said covering element being made of one or more of a staple fiber, an aromatic polyamide fiber or a flame-resistant fiber, and said impregnating agent includes one or both of a bituminous material and a synthetic resin, the improvement comprising wherein said center core and said covering element of said yarn are proportioned so that a ratio of said center core to the entirety is 35 to 70%, said center core has a thickness in the range of 100 to 300 TEX, said covering element has a thickness in the range of 150 to 300 TEX, and said covering element covers more than 80% of said center core, said cloth being woven from a multiple yarn which includes a metal wire twisted with said plurality of yarns.

2. In a frictional material which includes a cloth impregnated with an impregnating agent, said cloth including a plurally of yarns of a single type each having a center core in the form of a roving or a yarn of inorganic fiber and a covering element in the form of a sliver of an organic fiber, said covering element being wound around said center core so as to substantially cover said center core, said covering element being a mixture of a staple fiber and at least one of an aromatic fiber and a flame resistant fiber, said staple fiber constituting more than 80% of said covering element, said impregnating agent including one or both of a bituminous material and a synthetic resin, and said center core being made of one or more of a glass fiber, rock wool and a ceramic fiber, said covering element being made of one or more of a stapel fiber, and aromatic polyamide fiber or a flame-resistant fiber, and said impregnating agent a bituminous material a synthetic resin, the improvement comprising wherein said center core and said covering element of said yarn are proportioned so that a ratio of said center core to the entirely to 35 to 70%, said center core has a thickness in the range of 100 to 300 TEX, said covering element has a thickness in the range of 150 to 300 TEX, and said covering element covers more than 80% of said center core, said cloth being woven from a multiple yarn which is made by twisting a metal wire with said plurality of yarns.

3. In a frictional material which includes a cloth impregnated with an impregnating agent, said cloth including a plurality of yarns of a single type which are twisted with a metal wore, each said yarn having a center core in the form of a roving or a yarn of inorganic fiber and covering element in the form of a sliver of an organic fiber, said covering element being wound around said center core so as to substantially cover said center core, the improvement comprising wherein said center core and said covering element of said yarn are proportioned so that a ratio of said center core to the entirely is 35 to 70%, said center core has a thickness in the range of 100 to 300 TEX, and said covering element has a thickness in the range of 150 to 300 TEX, said cloth being woven from a multiple yarn which is said plurality of yarns twisted with said metal wire wherein said impregnating agent includes one or both of a bituminous material and a synthetic resin.

4. A frictional material according to claim 3, wherein said center core is made of one or more of a glass fiber, rock wool and a ceramic fiber; said covering element is made of one or more of a staple fiber, an aromatic polyamide fiber or a flame-resistant fiber.

* * * * *

UNITED STATES PATENT AND TRADEMARK OFFICE
CERTIFICATE OF CORRECTION

PATENT NO. : 5,326,628
DATED : July 5, 1994
INVENTOR(S) : Sirou TAKAHATA et al It is certified that error appears in the above-identified patent and that said Letters Patent is hereby corrected as shown below:

Column 3, line 29; change "cord" to ---core---.
Column 4, line 11; delete "said covering element being made".
lines 12 and 13 delete in their entirety.
line 14; delete "agent a bituminous material a synthetic resin,".
line 17; change "entirely to" to ---entirety is---.
line 27; change "wore" to ---wire---.
line 35; change "entirely" to ---entirety---.
line 44; before "said" insert ---and---.

Signed and Sealed this

Twenty-seventh Day of June, 1995

Attest:

BRUCE LEHMAN

Attesting Officer

Commissioner of Patents and Trademarks